United States Patent [19]

Katayama et al.

[11] 4,304,478
[45] Dec. 8, 1981

[54] INFORMATION INTRODUCING DEVICE OF AN ELECTRONIC FLASH UNIT

[75] Inventors: Akira Katayama; Hiroshi Hasegawa, both of Tokyo, Japan

[73] Assignee: Nippon Kogaku K.K., Tokyo, Japan

[21] Appl. No.: 207,670

[22] Filed: Nov. 17, 1980

[30] Foreign Application Priority Data

Nov. 28, 1979 [JP] Japan ............................ 54/153023

[51] Int. Cl.³ ..................... G03B 15/05; G03B 17/18
[52] U.S. Cl. ..................................... 354/128; 354/35; 354/145; 354/149; 354/289
[58] Field of Search ............... 354/127, 128, 139, 145, 354/149, 289, 35, 60 F

[56] References Cited

U.S. PATENT DOCUMENTS 4,080,612 3/1978 Maitani et al. ............... 354/289 X
4,251,147 2/1981 Sugimori et al. ................... 354/127

Primary Examiner—Michael L. Gellner
Attorney, Agent, or Firm—Shapiro and Shapiro

[57] ABSTRACT

In an electronic flash unit capable of being coupled to a camera body including a mounting section and an operating dial which can be rotatively operated to a predetermined position to set information regarding exposure factors and can be fixed at the predetermined position, the electronic flash unit including a support member having a mounting section engageable with the mounting section of the camera body, a transmitting member displaceable to a position responding to the predetermined position of the operating dial depending upon the engagement of the two mounting sections, and an electric circuit for controlling flash light emission, there is provided converting means for converting the information into electrical signals and introducing the same into the electric circuit. The converting means includes contact sections capable of contacting each other and secured to at least two spatially different regions relatively variable in position by the displacement of the transmitting member.

4 Claims, 6 Drawing Figures

INFORMATION INTRODUCING DEVICE OF AN ELECTRONIC FLASH UNIT

BACKGROUND OF THE INVENTION

1. Field of the Invention

This invention relates to the information introducing device of an electronic flash unit.

2. Description of the Prior Art

An electronic flash unit to be mounted on a camera to illuminate an object has recently become designed to exchange a plurality of bits of information with the camera and moreover, the types of information are in a tendency toward increase. The information transmitted includes a synchro signal produced in response to the shutter mechanism of the camera, a charging completion signal of the flash unit, and a signal warning of the impropriety of the set value of the shutter speed of the camera and in addition, in an electronic flash unit having the function of automatically controlling the quantity of emitted light so as to be fit for the object being photographed, information such as film speed and aperture value supplied from the camera body. Such information is usually transmitted as electrical signals through a plurality of electrical contacts provided in the coupling portion between the camera and the flash unit. However, as the types of information exchanged increase, the number of the electrical contacts and the number of the electric circuits including the electric circuit necessary for the supply of the information and the electric circuit necessary for the detection of the information increase to complicate the device.

On the other hand, some of such information is manually set by moving or displacing an operating member provided on the camera body or the flash unit. In most cases, the setting of exposure factors such as, for example, film speed and shutter speed is accomplished by rotating a dial device provided on the upper portion of the camera body. In U.S. Pat. No. 4,251,147 (German Pat. No. 29,16,353), applicant has proposed the technique of transmitting the amount of displacement of the film speed setting dial on the camera body to the flash unit inresponse to the mounting of the flash unit onto the camera.

SUMMARY OF THE INVENTION

An object of the present invention is to provide an information introducing device which enables information to be transmitted as electrical signals from a camera to a flash unit without providing any electrical contact in the coupling portion between the camera and the flash unit.

According to the present invention, a mechanism for detecting, upon completion of the coupling between the flash unit and the camera body, the set position of an information setting member displaceably disposed on the camera body and operable to set exposure factors is provided on the flash unit, and the detecting mechanism is designed to convert the obtained position information into electrical information and produce the same.

The invention will become more fully apparent from the following detailed description thereof taken in conjunction with the accompanying drawings.

DESCRIPTION OF THE PREFERRED EMBODIMENTS

The invention will hereinafter be described with respect to an embodiment thereof.

Figure 1:
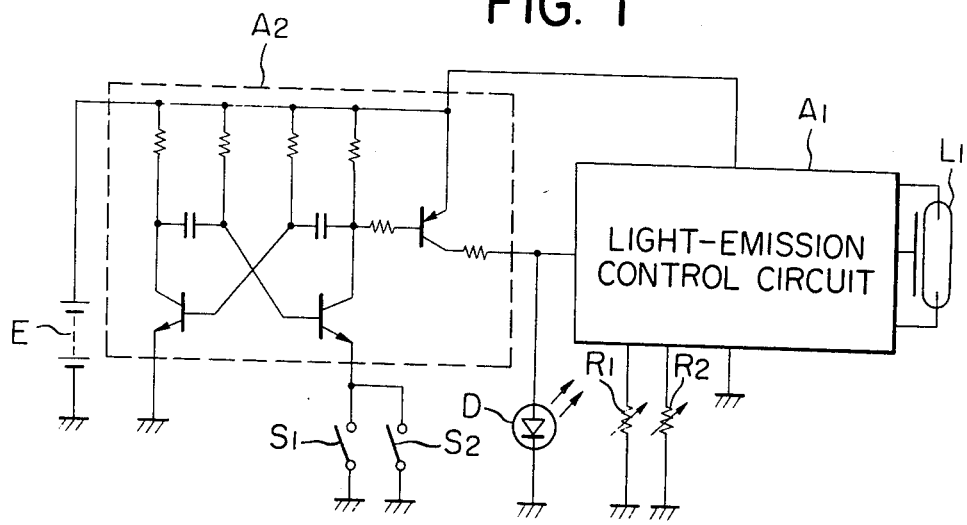
FIG. 1 is a diagram of an electric circuit used in an embodiment of the present invention.

Referring to FIG. 1 which shows an example of the electric circuit used in the device of the present invention, a circuit A1 is one for controlling the light emission of a flash discharge tube L and includes a DC/DC converter, a flash emitting energy accumulating capacitor, a light emission trigger circuit, a light quantity integrating circuit and a light emission stopping circuit. Variable resistors R1 and R2 are for introducing film speed and aperture value information. For example, in the case of the automatic dimming type electronic flash unit, the reference voltage of the light quantity integrating circuit is determined by the information introduced by the resistors R1 and R2 and, when this determined reference voltage and the light quantity integrated value assume a predetermined relation, the flash emission is stopped.

However, in such an electronic flash unit, where the set film speed is very high, the light quantity control sometimes becomes impossible. Therefore, when the set film speed is outside of the light quantity control range, it is necessary to give some warning. Therefore, when a switch S1 is closed when the set film speed exceeds a predetermined value, a warning circuit A2 having an oscillation circuit such as a monostable multivibrator turns on and off a light emitting diode D at a predetermined period, thereby warning the operator of this.

Further, if the electronic flash unit is incompletely mounted to a camera, there is not only the danger of the flash unit slipping off but also a case where the transmission of the set film speed is incomplete and therefore, such incomplete mounting must be annunciated. If a switch S2 disposed parallel to the switch S1 is designed so as to be closed upon incomplete mounting, the light emitting diode D can also be turned on and off to annunciate this. Design may also be made such that when the switch $S_2$ is closed, a sound producing member such as a buzzer is operated.

Figure 2:
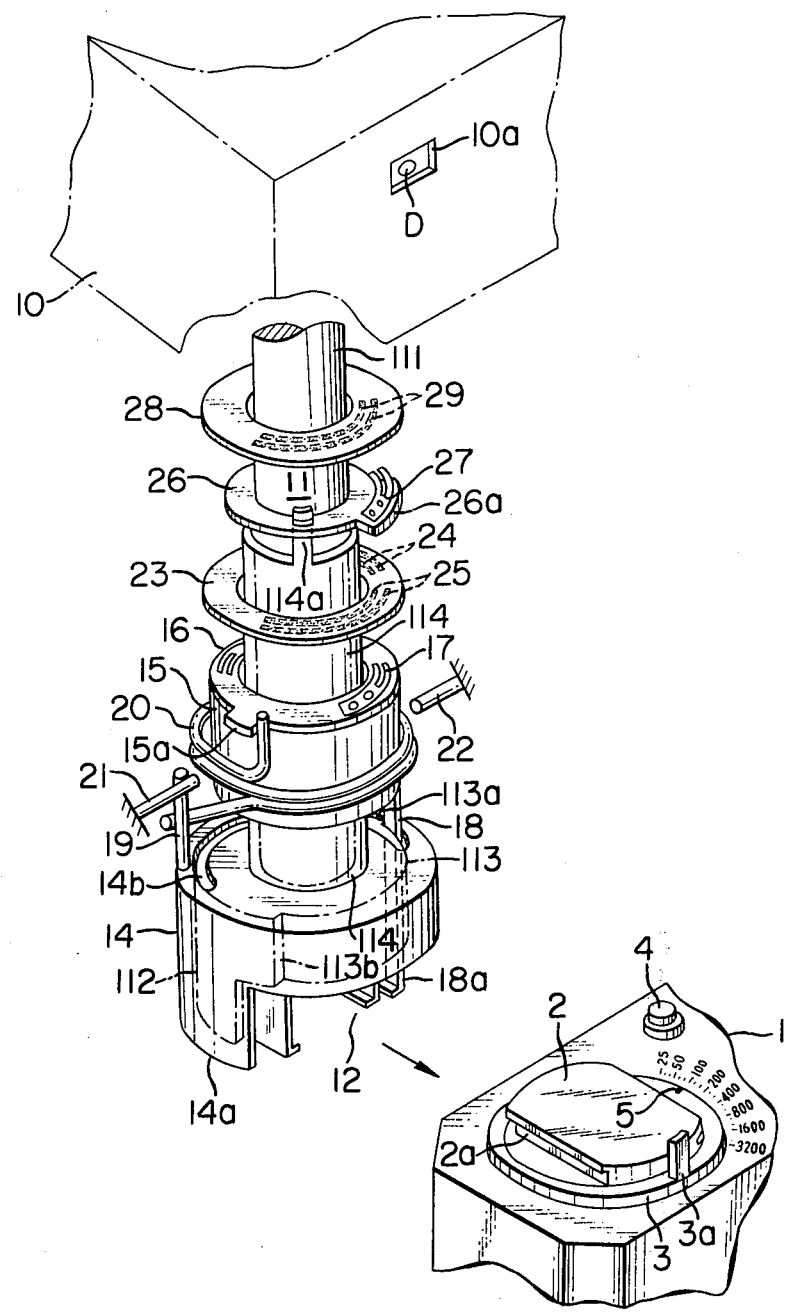
FIG. 2 is an exploded perspective view showing an embodiment of the present invention.

Description will now be made of a mechanism for operating the switches S1, S2 and variable resistor R2. Referring to FIG. 2, and electronic flash unit mounting shoe seat 2 is secured to a camera body 1. The shoe seat 2 has a guide groove 2a. A film speed setting dial 3 having a signal pin 3a secured thereto is rotatably supported around the shoe seat 2. A locking device (not shown) makes the dial 3 rotatable only when a button 4 is depressed. The setting of the film speed may be accomplished by depressing the button 4 and rotating the dial 3 so that an index mark 5 becomes registered with desired one of film speed divisions 25, 50, . . . , 3200.

A box member 10 for containing therein the light emitting portion or the like of the electronic flash unit is provided with a window 10a for displaying the light emitting diode D. A support member 11 fixed to the box member 10 has a strut portion 111 and a pedestal portion 112 which are made integral with each other. The pedestal portion 112 has secured thereto a mounting member 12 insertable into the guide groove 2a of the shoe seat 2. Also, the pedestal portion 112 is provided with a cut-away portion 113 delimited by cut-away end faces 113a and 113b. A lock ring 14 is disposed over the pedestal portion 112 and is rotatable with respect to the pedestal portion 112. The lock ring 14, as will later be described, has a slip-off preventing piece 14a acting to prevent the mounting member 12 from slipping out of the guide groove. A tube 114 formed integrally with the lock ring 14 is loosely fitted over the strut 111. A detecting ring 15 supported for rotation relative to the tube 114 has brushes 16 and 17 secured thereto, and is provided with a detecting piece 18 having a downwardly extending engaging end 18a coming into a cut-away portion 113 through a slot 14b formed in the lock ring 14. A spring 20 is extended between a pin 19 studded in the lock ring 14 and the projection 15a of the detecting ring 15. By this spring 20, the lock ring 14 and the detecting ring 15 are coupled together so as to normally rotate with each other. Pins 21 and 22 are positioned in the rotational orbit of the pin 19 and control the angle of rotation of the lock ring 14.

An insulative base plate 23 fixed to the device body is provided with a conductor 24 capable of contacting the brush 16 and a resistor 25 capable of contacting the brush 17. A disc 26 rotatably supported on the strut 111 has a portion thereof coupled to the projection 114a of the tube 114 so that the former is rotated with the latter. A brush 27 is fixed to a portion 26a of the disc 26. An insulative base plate 28 fixed to the device body is provided with a conductor 29 capable of contacting the brush 27. The brush 16 and the conductor 24 together constitute the switch S1 of FIG. 1, the brush 17 and the resistor 25 together constitute the reliable resistor R1, and the brush 27 and the conductor 29 together constitute the switch S2.

Figure 3:
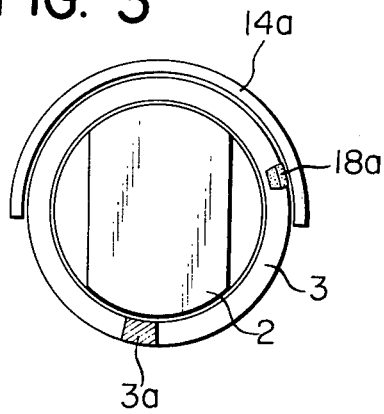
FIGS. 3 to 6 illustrate the operation for mounting an electronic flash unit onto a camera body.

Operation will now be described. To mount the electronic flash unit onto the camera body, the mounting member 12 is first inserted from the condition of FIG. 2 into the guide groove 2a. The completed condition of this insertion is illustrated in FIG. 3. It is to be understood that the film speed is set to ASA100 by the dial 3 and the signal pin 3a is in its position shown in FIGS. 2 and 3. When the insertion is completed, the lock ring 14 is then rotated clockwisely. Thereupon, the pin 19 is also rotated clockwisely, so that the detecting ring 15 is also rotated in the same direction by means of the spring 20. Therefore, the brush 17 slides on the resistor 25, so that the resistance value of the variable resistor R1 is varied. The detecting piece 18 is also rotated with the detecting ring 15. The signal pin 3a is positioned in the rotational orbit of the engaging end 18a of the detecting piece 18 and therefore, as the rotation of the lock ring 14 progresses, the engaging end 18a is restrained by the signal pin 3a. Thereupon, the rotation of the detecting ring 15 is stopped and thus, the resistance value of the variable resistor R1 corresponds to the position of the signal pin 3a, namely, ASA100.

Figure 4:
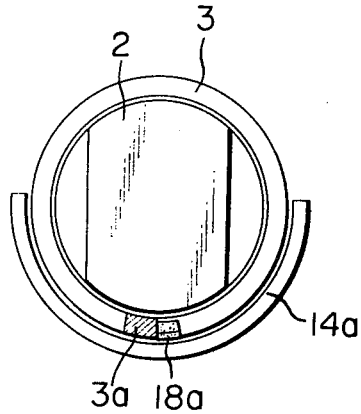

The lock ring 14 is further rotated while charging the spring 20 until the pin 19 is restrained by the pin 22. In this manner, complete mounting is accomplished so that the electronic flash unit does not slip off the camera body. That is, in the completed condition of mounting, the slip-off preventing piece 14a has been rotated through 180° from the position of FIG. 3 as shown in FIG. 4 and therefore, even if a force is imparted to the electronic flash unit in the direction opposite to the mounting direction, slip-off is prevented by the engagement between the slip-off preventing piece 14a and the dial 3.

Figure 6:
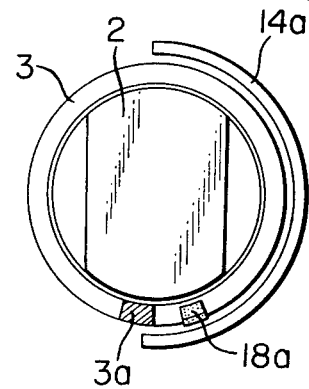

When the lock ring 14 is completely rotated, the brush 27 is moved to a position in which it does not contact the conductor 29, by the projection 114a of the tube 114, so that the switch $S_2$ is opened. In constrast, if the lock ring 14 is not completely rotated as shown in FIG. 6, the brush 27 is in contact with the conductor 29, so that the switch $S_2$ is closed and as a result, the warning by the light emitting diode D is effected.

Figure 5:
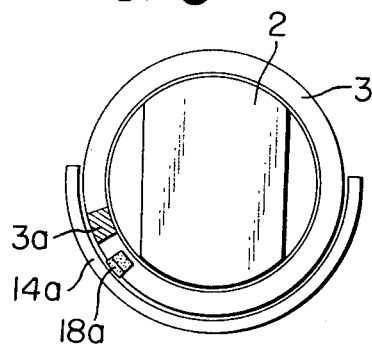

Description will now be made of the operation when the film speed has been set to a value outside of the control range, for example, a value greater than ASA1600. Here, it is to be understood that the spacing between the end faces 113a and 113b which delimit the cut-away 113 corresponds to the angle of rotation of the signal pin 3a within the control interlocking range. Accordingly, even if the lock ring 14 is completely rotated, the rotation of the detecting piece 18 is controlled by the end face 113b in the course of the rotation of the lock ring and as a result, the detecting piece 18 does not rotate any further (this condition is illustrated in FIG. 5). At this time, the brush 16 comes into contact with the conductor 24, and the switch S1 is closed. Accordingly, the warning by the light emitting diode D is effected. It is to be understood that the resistor R2 is varied by separate operation.

We claim:

1. In an electronic flash unit capable of being coupled to a camera body including a mounting section and an operating dial which can be rotatively operated to a predetermined position to set information regarding exposure factors and can be fixed at said predetermined position, said electronic flash unit including a support member having a mounting section engageable with said mounting section of said camera body, a transmitting member displaceable to a position responding to said predetermined position of said operating dial depending upon the engagement of said two mounting sections, and an electric circuit for controlling flash light emission, the improvement comprising:
    converting means for converting said information into electrical signals and introducing the same into said electric circuit, said converting means including contact sections capable of contacting each other and secured to at least two spatially different regions relatively variable in position by the displacement of said transmitting member.

2. An electronic flash unit according to claim 1, wherein said converting means includes a variable resistor whose value is variable in response to the displacement of said transmitting member.

3. An electronic flash unit according to claim 1, wherein said operating dial can be set in coincidence with the speed of a film loaded into said camera body, and said converting means includes switch means responsive to the position change of said transmitting member when the film speed set by said operating dial exceeds a range fit for said flash unit, and warning means operable in response to said switch means.

4. An electronic flash unit according to claim 1, wherein the improvement further comprises:
    a displaceable lock member operable, after the engagement of said two mounting sections, to hold said engagement;
    switch means adapted to operate upon completion of the operation of said lock member; and
    warning means operable in response to said switch means.

* * * * *